United States Patent [19]
Feld
[11] 3,930,200
[45] Dec. 30, 1975

[54] FM MONITORING SYSTEM

[76] Inventor: Stanley J. Feld, 209 East and West Road, West Seneca, N.Y. 14224

[22] Filed: Oct. 3, 1974

[21] Appl. No.: 511,777

[52] U.S. Cl. .......... 325/134
[51] Int. Cl.[2] .......... H04B 17/00
[58] Field of Search .......... 325/363–364, 325/133–134, 2, 31, 67; 343/17.7; 324/77 R; 178/DIG. 4

[56] References Cited

UNITED STATES PATENTS

| | | | |
|---|---|---|---|
| 2,272,768 | 2/1942 | Crosby | 325/133 X |
| 2,297,752 | 10/1942 | DuMont et al. | 325/133 X |
| 2,324,915 | 7/1943 | Dow | 325/134 X |
| 2,329,625 | 9/1943 | Kentner | 325/133 X |
| 3,245,005 | 4/1966 | Garfield | 325/134 X |

OTHER PUBLICATIONS

Bolgiano, "Techniques of Program Level Measurement Applicable to FM Stereo," Journal of the Audio Engineering Society, Jan. 1963, Vol. 1 No. 1 pp. 53–60.

*Primary Examiner*—Benedict V. Safourek
*Assistant Examiner*—Robert Hearn
*Attorney, Agent, or Firm*—Cyril A. Krenzer

[57] ABSTRACT

FM Monitoring apparatus includes a receiver adapted to receive transmitted frequency modulation RF signals and having a first channel operative to process the signals to provide an aural indication of the signal content of the transmitted signal, and further including electronic switch and calibrator circuit with the electronic circuit operative to alternately apply portions of the received FM signal transmission and the outputs from the calibrator circuit to a second signal processing channel which is connected to a cathode ray oscilloscope. Horizontal drive circuit are connected to the cathode ray oscilloscope and are operative to provide a sweep frequency whereby the cathode ray oscilloscope has a display which indicated the modulation limits applicable to the frequency modulation signal transmissions and the relationship of the actual received signals to these modulation limits.

12 Claims, 11 Drawing Figures

FM MONITORING SYSTEM

BACKGROUND OF THE INVENTION

The present invention is directed to FM communications apparatus and more particularly to monitoring apparatus adapted to receive transmitted FM signals and provide a visual indication of the relative strength of selected components of the transmitted signal.

The FCC regulations concerning the percentage modulation of FM station signals require that the modulation shall be maintained as high as possible consistent with good quality of transmission and good broadcasting practice. In no case is the modulation to exceed 100% on peaks of frequent recurrence and generally it should not be less than 85% of peaks of frequent recurrence, but when necessary to avoid objectionable loudness, modulation may be reduced to the level necessary to avoid objectionable loudness even if the resulting modulation is substantially less than 85% on peaks of frequent recurrence. The FCC regulations also require that with respect to stereo FM signals transmitted, the 19 kilo-hertz pilot signal must be transmitted at a level not in excess of 10% of full modulation and not to be less than 8% of full modulation.

The FCC requirements relating to modulation applies to both FM radio stations and the FM sound portion of the composite television signal. Many stations in an attempt to comply with these regulations will resort to various compression or limiting amplifiers in an attempt to assure they do not exceed the 100% modulation limit, which if exceeded could cause crosstalk in an adjacent FM station. However, the use of such limiting devices may tend to cause the percent modulation to be generally less than 85%, which can degrade the quality of the transmission. In many cases even with the use of limited modulation to the transmitter, stations can be either consistently over or under modulating the carrier. To a large extent this difficulty is due to the lack of a good dependable monitoring system capable of making available an instant, accurate means with which to check percentage modulation transmission of various components of the transmitted signal, while maintaining regular station programming.

Prior art monitoring systems have frequently utilized meter indicators to give a visual indication of the amount of modulation of an FM carrier. The difficulty with such systems is that they require frequent calibration to correct for any change in the balistic consideration of the meter, and further, such meters generally read only one side of the monitored modulation component, that is, either the positive or the negative half cycle of the signal and not both. Therefore, unless the reference level is extremely accurate and the modulation is uniform about the reference level, such a metering system is capable of giving an erroneous indication of the amount of modulation.

OBJECTS AND SUMMARY OF THE INVENTION

Accordingly it is a principal object of the invention to provide a monitoring system for FM broadcasts signals which makes available a constant, instant, accurate means to check selected components of the modulation of the transmitted signal.

Another object of the invention is to provide an FM transmission monitoring system which checks percent modulation of the transmitted signal and also provides both a visual and oral verification of the transmitted signal.

Yet another object of the present invention is to provide an FM transmission monitor wherein calibration can be checked and accomplished at any time without disrupting normal station operation.

A more specific object of the invention is to provide a constant, instant, accurate visual check of modulation components of a transmitted signal through the use of an oscilloscope which is operative to display instantaneous peaks of modulation from zero to 100 percent.

Still another object of the invention is to provide an FM transmission monitoring system which does not require frequent calibration and which is not dependent upon ballistic consideration such as are used with meter monitors.

The foregoing and other objects and advantages are accomplished according to one aspect of the invention which includes an antenna and an RF amplifier/converter which is accurately tuned to the allocated frequency of the transmitting FM station. The output from RF amplifier/converter is applied to an IF amplifier which has two outputs, the first going through a standard FM receiver including a limiting detector, multiplex decoder and amplifier to a pair of head sets or other listening means. The second output of the IF amplifier is applied to an electronic switch, which also has an input from a calibrator apparatus. The output from the electronic switch is applied to an IF amplifier limiter, through a discriminator and vertical amplifier to the vertical input of an oscilloscope display device. A horizontal drive circuit takes standard clocking pulses and set frequency signals from the oscilloscope and applies them to the horizontal input terminals of the oscilloscope. The calibrator is crystal tuned to provide the various output signals which when passed through the switch and subsequent apparatus, will provide very accurate and well defined visual signals on the oscilloscope display. The electronic switch alternately applies the IF amplifier signals and the calibrator signals through the electronic apparatus to the oscilloscope in a manner such that the output signals from the IF amplifier are superimposed upon the signals derived through the calibrator and thereby provide the desired accurate, instantaneous check of the selected modulation levels.

DESCRIPTION OF THE PREFERRED EMBODIMENT

For a better understanding of the present invention, reference is had to the following detailed description taken in conjunction with the above described drawings.

Figures 1, 2:
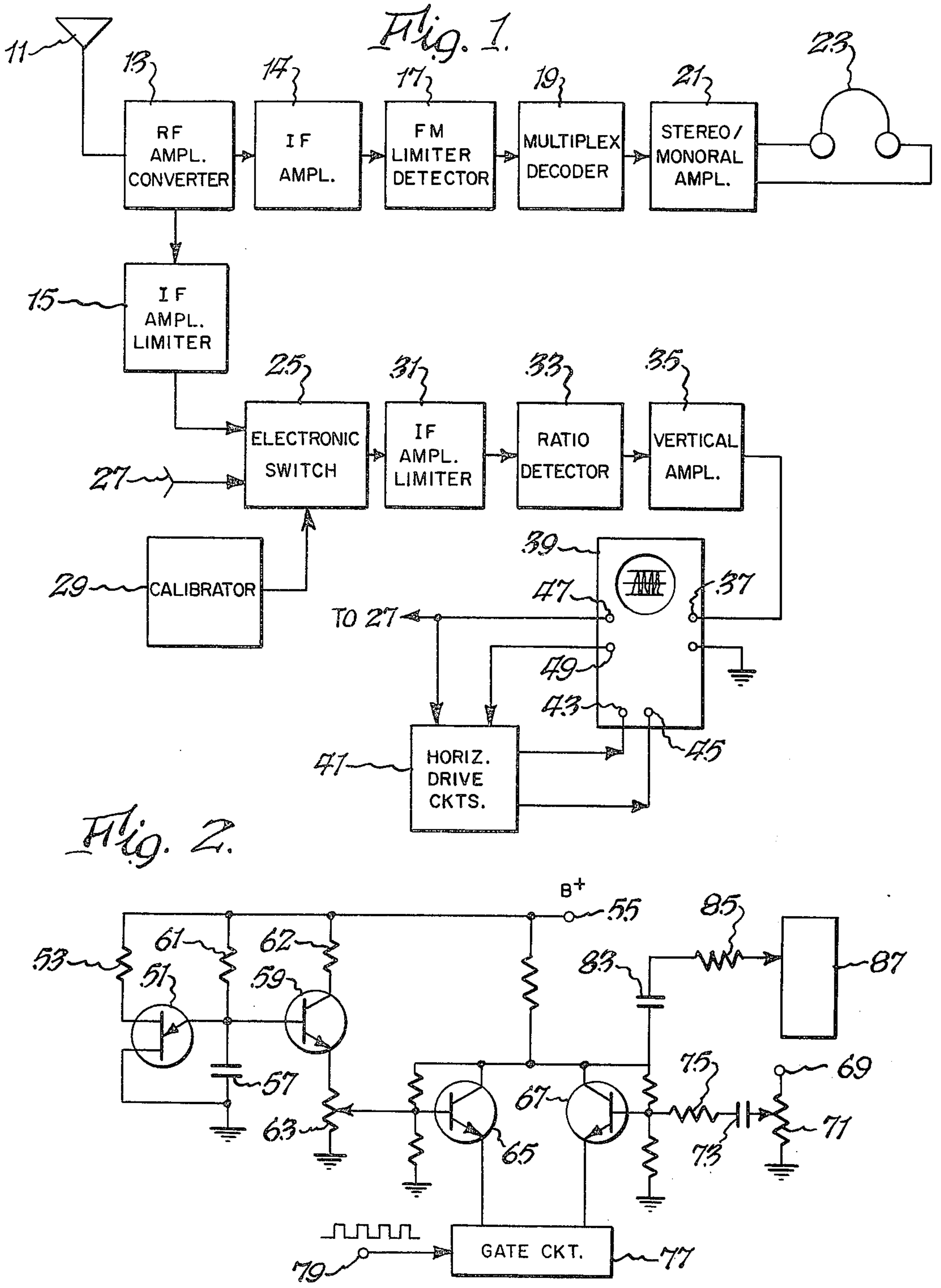
FIG. 1 is a schematic block diagram of an FM monitoring system according to the present invention.
FIG. 2 is a schematic circuit diagram of a preferred horizontal drive circuit configuration for the monitoring system of FIG. 1.

Referring first to FIG. 1, the block diagram of the FM Monitor according to the present invention includes an antenna 11 adapted to receive transmitted RF signals and apply them to an RF amplifier/converter 13, the output of which is applied to an intermediate frequency amplifier 14. The output from the intermediate frequency amplifier 14 is applied through an FM limiter detector 17 to a multiplex decoder 19, the output of which is applied through a stereo/monoral amplifier 21 to a suitable listening device such as a pair of headphones 23. An output from a second intermediate frequency amplifier 15 is applied to an electronic switch 25, which also has inputs from a clock source indicated by numeral 27 and a calibrator unit 29. The output from the electronic switch is applied to a further intermediate amplifier-limiter 31, the output of which is applied to a detector 33 to a vertical amplifier 35. The output of the vertical amplifier is connected to the vertical input terminal 37 of a cathode ray display device such as an oscilloscope 39. Horizontal drive circutry 41 receiving inputs from signal sources 47 and 49 of the oscilloscope has its outputs connected to the horizontal input terminals 43 and 45 of the oscilloscope 39.

Figure 3:
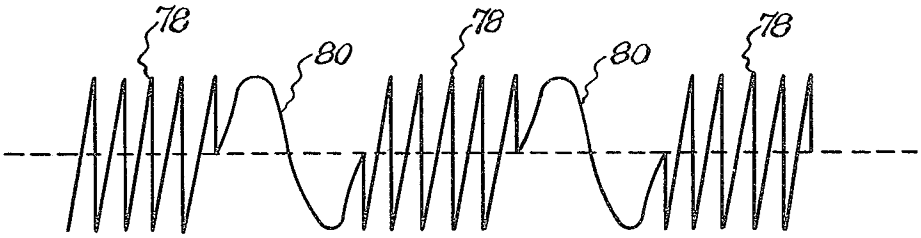
FIG. 3 is a diagrammatic representation of the composite signal applied to the amplifiers 87 of FIG. 2.

Referring next to FIG. 2 there shown in schematic form, a preferred horizontal drive circuit according to the present invention which includes a unijunction transistor 51 having the drain thereof connected via a resister 53 to a source of operating potential 55 and having the source thereof connected to a point of reference potential such as ground. The gate of the unijunction transistor is connected to ground by a capacitor 57 and is also connected directly to the base of a transistor 59 and via resistor 61 to the source of operating potential 55. A resistor 62 is connected between the collector of transistor 59 and the source of operating potential 55, and a variable resistor 63 is connected between the emitter of transistor 59 and ground. A flip-flop circuit, including transistors 65 and 67, receives a first input applied to the base of transistor 65 via the center tap on resistor 63 and receives a second input applied to the base of transistor 67 at terminal 69, which may be, for example, a 120 hertz sinusoidal signal received from the oscilloscope and developed across a variable resistor 71. The center tap of the variable resistor 71 is connected by a capacitor 73 in series with resistor 75 to the base of the transistor 67 of the flip-flop circuit. The emitter electrodes of the transistors 65 and 67 are connected to a gating circuit 77, which has an input at terminal 79 from the oscilloscope, the input being, for example, a square wave clock pulses of pre-determined frequency. The output from the transistor 59 applied by a variable resistor 63 to transistor 65 is a ramp signal which is preferably at a frequency of about 15 kilohertz. With these ramp signals and the 120 hertz signals from the scope, the flip-flop including transistors 65 and 67 develops an output which is basically alternating fifteen kilo-hertz ramp signals 78 interposed between components of 120 hertz sinusoidal signals 80, such as shown in FIG. 3, which are applied via capacitor 83 and resistor 85 to a conventional linear amplifier circuit 87, the outputs from which are connected to the the terminals 43 and 45 respectfully of the oscilloscope 39 of FIG. 1. The gate circuit 77 operating in response to the clocking pulses applied at the input terminal 79 thereof, causes alternate conduction of transistors 65 and 67 in conventional flip-flop operation to provide the composite output signal 81.

Figure 4:
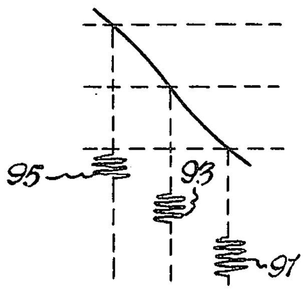
FIGS. 4 through 6 are diagrammatic representations of signals derived from the calibrator and processed through the monitoring apparatus.
Figure 5:
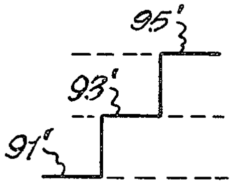

FIG. 4 illustrates typical signals which could be derived from the calibrator 29 and applied to the electronic switch 25. The burst signals 91, 93, and 95, represent bursts of three separate frequencies, which are sequentially applied to the electronic switch 25. For example, if one is monitoring the percent modulation of the signal derived from the IF amplifier 15 having a center frequency of 10.7 mega-hertz, then signal 91 would be a burst at 10.625 mega-hertz, signal 93 would be a burst at 10.7 mega-hertz, and signal 95 would be a burst at 10.775 mega-hertz. These represent the center band frequency, and the lower and upper modulation limits, respectively. When these signals are applied through the electronic switch and the IF amplifier to the ratio detector 33, an output from the detector results as shown in FIG. 5, being a basic square wave step signal. When this signal is applied via the vertical amplifier 35 to the terminal 37 of the oscilloscope, it provides a raster display as shown by lines 91'', 93'' and 95'' in FIG. 6, assuming a fast horizontal sweep on the oscilloscope.

Figure 6:
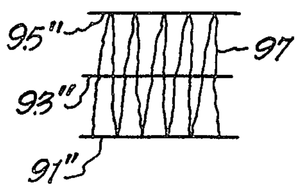

The lines 91'', 93'' and 95'' on the display of FIG. 6 therefore represent accurate limits of the lower modulation limit, the center frequency, and the upper modulation limit, for example, for a transmitted FM signal. On alternate cycles then, if the electronic switch passed the modulated signals from the IF amplifier through the IF amp limiter 31, detector 33 and vertical amplifier 35, it will appear as a superimposed signal 97 on the display and thus a very rapid visual check will indicate with reasonable exactness, the percent modulation, of the transmitted signal.

It will be understood that the signal 97 shown in FIG. 6 represents a signal of the optimum percentage of modulation about the center frequency denoted by line 93'' with the proper upper limit represented by line 95'' and lower limit represented by line 91''. In the event that the percent of modulation is less than limits established by the system as represented by the bounds 91'' and 95'', the visually observed signal 97 would be seen within these lines; and conversely, if there is an over-modulation, the signal 97 would exceed the bounds of these lines.

Figure 7:
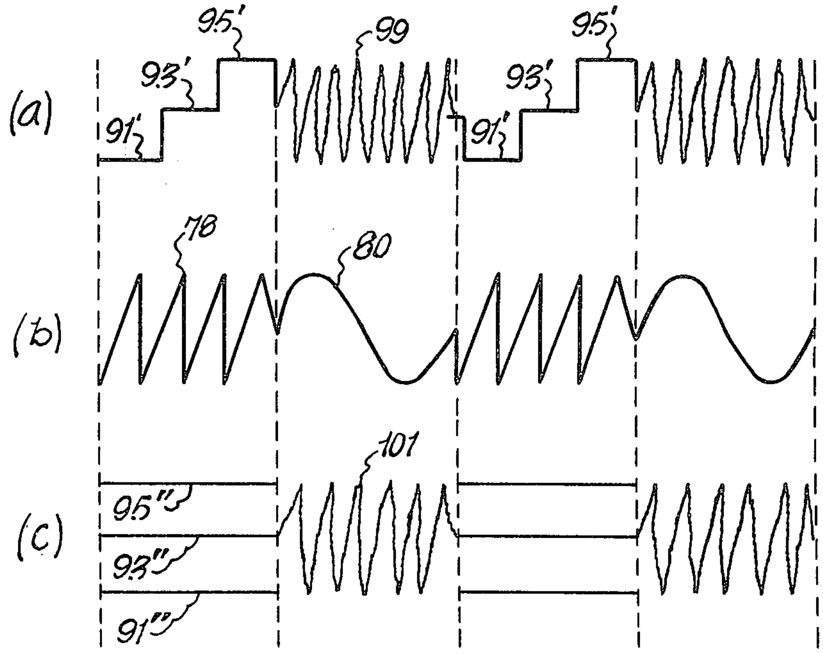
FIGS. 7 (*a*), 7 (*b*), and 7 (*c*) are composite diagrammatic signal representations of the signals applied to the display device and the resultant display signal.

FIGS. 7 (*a*), (*b*), and (*c*) are diagrammatic signal representations in time sequence of the signals applied to the vertical input of the oscilloscope 39, the horizontal input of the oscilloscope 39 and the resultant display signal on the oscilloscope, respectively. In the first time sequence of FIG. 7 (*a*) the step signals 91', 93' and 95', previously shown in FIG. 5, are in time sequence with the saw tooth outputs 78 from the horizontal drive circuit 41 as shown in FIG. 7 (*b*). Since the saw tooth signal 78 represents a frequency of approximately 15 kilo-hertz, the resultant display on the oscilloscope will appear to the eye as three straight lines 91'', 93'', and 95'', respectively as seen in FIG. 7 (*c*). In a typical situation this first time frame would be on the order of 1/120 of a second. In the second time interval, the signal output 99 from the vertical amplifier is in time coincidence with the 120 hertz sign wave signal 80 from the horizontal drive circuits. These result in a display 101 on the oscilloscope, but because of the fast sweep of the oscilloscope, the eye will perceive the display as shown in FIG. 6. This time interval again is about 1/120 of a second. In subsequent time intervals, the aforementioned sequences are repeated. It is pointed out at this time that the signal outputs 91′, 93′ and 95′ need not appear in a given order, since any sequence of signals at the appropriate frequencies will give the desired reference line indicators as shown in FIGS. 7 (*c*).

Figure 8:
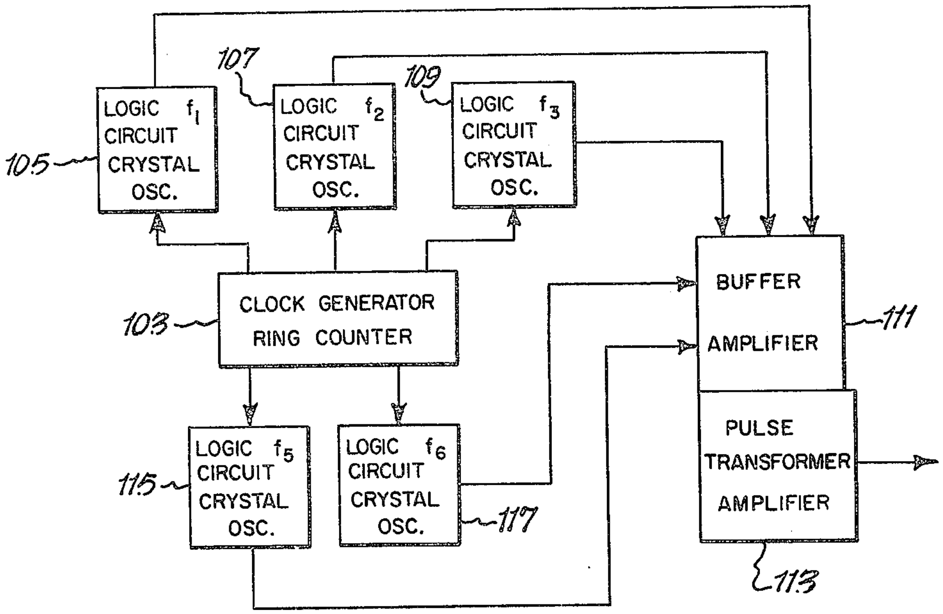
FIG. 8 is a block diagram of one embodiment of a calibrator system according to the present invention.

Referring now to FIG. 8 there is shown one embodiment in block diagram form of a calibrator adapted to provide the desired signals to the electronic switch 25 according to the present invention. The calibrator includes a clock generator, ring counter 103 with outputs going therefrom to logic circuit crystal oscillators 105, 107 and 109. These logic circuit, crystal oscillators are crystal controlled to provide highly accurate frequency outputs *f*1, *f*2 and *f*3, respectively. The outputs from the crystal oscillators 105, 107 and 109 are applied to a buffer amplifier 111, which drives a pulse transformer amplifier the output of which is applied as indicated in FIG. 1 to the electronic switch 25. Alternatively, the outputs from the clock generator ring counter 103 can be applied to different logic circuit, crystal oscillators such as oscillators 115 and 117, operating at frequencies designated as *f*5 and *f*6 respectively, the outputs from which are similarly applied to the buffer amplifier 111. It is to be understood that the clock generator ring counter through an appropriate switching mechanism would activate either the three oscillators 105, 107 and 109 or the oscillators 115 and 117, but never both sets of oscillators at the same time. Considering the operation of the calibrator of FIG. 8 in conjunction with the signal display of FIG. 4, the frequencies *f*1, *f*2 and *f*3 might be the signal outputs 91, 93 and 95, respectively, shown in FIG. 4 representing the center frequency 10.7 mega-hertz signals of an FM intermediate frequency signal and the upper and lower modulation limits. The purpose of the clock generator ring counter is to sequentially activate the logic circuits 105, 107 and 109 to provide a train of output signals at the selected frequencies via the buffer amplifier 111 and the pulse transformer amplifier 113 to the electronic switch 25.

In an alternative configuration the clock generator ring counter 103 can be activated to control the logic circuit oscillators 115 and 117 which could represent, for example, a plus 7.5 kilo-hertz signal frequency and a minus 7.5 kilo-hertz signal frequency about a center point which signal frequencies would represent the stereo pilot signal modulation limits in an FM stereo transmission/receiving system operated in well known fashion to generate an FM stereo signal from an appropriate receiver. When the calibrator is activated in this mode of operation, only two display lines would result on the oscilloscope display 39 representing the upper and lower modulation limit for the stereo pilot signal.

Figure 9:
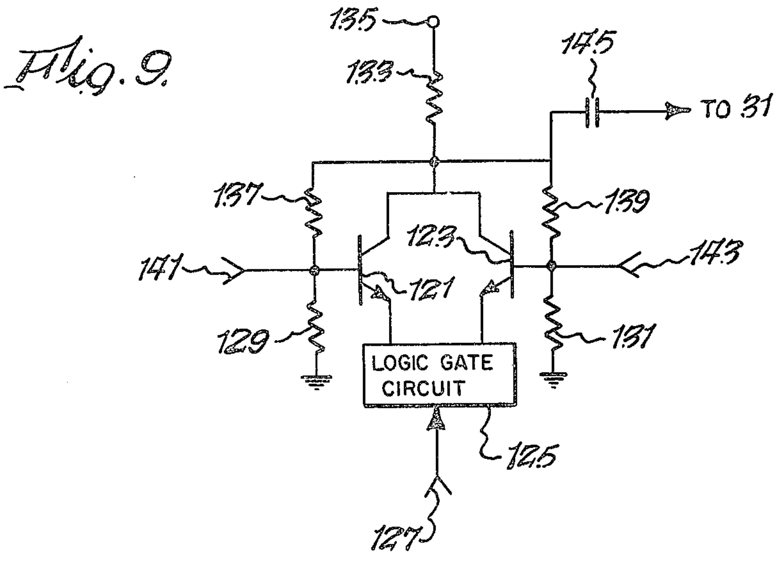
FIG. 9 is a partial schematic/block diagram of one embodiment of an electronic switch adapted for use according to the present invention.

The circuit of FIG. 9 represents a simplified flip-flop gating circuit which operates to perform the function of the electronic switch 25 according to the present invention. The circuit includes first and second transistors 121 and 123 having inputs to the respective emitter electrodes from a logic circuit 125. The input 127 to the logic gate circuit might be, for example, a 120 hertz square wave signal. The base electrodes of the transistors 121 and 123 are connected to a source of reference potential, such as ground, by resistors 129 and 131, respectively. The collector electrodes of the respective transistors are connected together by a resistor 133 to a source of energizing potential represented by terminal 135. Resistors 137 and 139 are connected between the base and collector electrodes of the transistors 121 and 123, respectively. The input 141 to the base of the transistor 121 is derived from the IF amplifier limiter 15 of FIG. 1, and the input 143 to the base of the transistor 123 is the output from the calibrator 29 of FIG. 1. The outputs from the transistors 121 and 123 are applied by a capacitor 145 to the IF amplifier limiter circuit 31 of FIG. 1. In operation, the 120 hertz square wave input signal to the logic gate circuit is operative to alternately cause conduction of transistors 121 and 123 to thereby alternately apply the signals 141 and 143, respectively in time sequence via capacitor 145 to the output going to the IF amplifier limiter 31.

It is therefore apparent that applicant has provided an improved FM monitoring system capable of a very accurate visual indication of the modulation characteristics of a transmitted FM signal. The system is also capable of giving an aural indication of the signal qualities which, when combined with the visual measurement, provides a highly satisfactory and accurate method for monitoring a transmitted FM signal. While the foregoing invention has been illustrated in the context of the foregoing preferred embodiment, it will be readily apparent to those skilled in the art that many modifications and variations may be made thereto without departing from the spirit or teaching of the invention. It is therefore intended that the invention not be limited to the specifics of the foregoing detailed description, but rather is to embrace the full scope of the following claims.

What is claimed is:

1. Modulation apparatus for monitoring frequency modulated signal transmissions comprising:
   - means for deriving the frequency modulation signal components from said frequency modulated signal transmission;
   - means for generating controlled sequential bursts of continuous wave signals at predetermined frequencies, said bursts bearing a fixed relation to modulation limits for said frequency modulated signal transmission;
   - display apparatus including a visual display screen; and
   - signal processing apparatus operative to alternately apply the frequency modulation signal components from said frequency modulated signal transmissions and the controlled sequential bursts of continuous wave signals to said display apparatus, whereby a visual display is presented to show the relation of the frequency modulation of the signal transmissions to the modulation limits as represented by said sequential bursts of continuous wave signals.

2. The invention according to claim 1 wherein said display apparatus is a cathode ray oscilloscope including horizontal and vertical input terminals wherein the inputs to the vertical input terminals is derived from said signal processing apparatus and further including horizontal drive circuit means adapted to provide a composite drive signal consisting of a plurality of saw tooth wave signals alternated between sinusoidal signal components of predetermined frequency, said composite drive signal being adapted to be applied to the horizontal input terminals of said cathode ray oscilloscope.

3. The invention according to claim 1 wherein said means for generating controlled sequential bursts of continuous wave signals at predetermined frequencies comprises:

at least a first plurality of crystal controlled logic circuit oscillators, each adapted to provide a continous wave output at a fixed frequency;

a circuit clock generator ring counter operative to sequentially activate each of said crystal controlled logic circuit oscillators; and buffer and pulse transformer amplifier means operative to receive the outputs from said crystal controlled logic circuit oscillators and provide a composite output of a repeating sequence of bursts of continous wave signals.

4. The invention according to claim 3 wherein said plurality of crystal controlled logic circuit oscillators consists of three oscillators, the first providing a signal output at 10.625 mega-hertz, the second providing a signal output at 10.700 mega-hertz and the third providing a signal output at 10.775 mega-hertz.

5. The invention according to claim 4 additionally comprising a second plurality of two crystal controlled logic circuit oscillators, one providing a signal output at plus 7.5 kilo-hertz and the other providing a signal output at minus 7.5 kilo-hertz.

6. The invention according to claim 1 wherein said signal processing apparatus includes electronic switching means logically controlled to alternately pass the frequency modulation signal components from said frequency modulated signal transmissions and controlled sequential bursts of continuous wave signals.

7. The invention according to claim 6 wherein said signal processing apparatus additionally comprises:

amplifier limiter circuit means adapted to receive the output from said electronic switching means;

ratio detector circuit means adapted to receive the output from said amplifier limiter circuit means; and vertical amplifier circuit means operative to receive the output from said ratio detector circuit means and provide a signal output therefrom adapted to be applied to said display apparatus.

8. The invention according to claim 2 wherein said horizontal drive circuit means comprises:

sawtooth generator circuit means operative to provide a continous train of sawtooth wave signals at a predetermined frequency;

a source of continous sinusoidal signals of predetermined frequency;

a flip-flop circuit having two input terminals, the first adapted to receive the continous train of sawtooth wave signals and the second adapted to receive the continous sinusoidal signals; and gate circuit means operative to sequentially gate said flip-flop circuit to provide a composite output signal consisting of a plurality of sawtooth wave signals alternated between said sinusoidal signal components.

9. The invention according to claim 8 wherein said sawtooth generator circuit means operates at a frequency of 15 kilo-hertz.

10. The invention according to claim 8 wherein the frequency of said continous sinusoidal signals is one hundred and 20 hertz.

11. The invention according to claim 1 additionally comprising means for providing an aural indication of the received frequency modulated signal transmissions.

12. Apparatus for monitoring the modulation of a transmitted frequency modulation signal including:

apparatus operative to receive said signal and generate therefrom an intermediate frequency component of said frequency modulation signal;

calibrator apparatus operative to provide sequential bursts of controlled signals at predetermined frequencies;

cathode ray display apparatus including horizontal and vertical input terminals adapted to receive signal inputs;

amplifier circuit means having output terminals, said output terminals being connected to the vertical input terminals of said cathode ray display apparatus;

drive circuit means operative to provide a composite output signal having selected signal components of predetermined form and frequency;

means for applying the output signal from said drive circuit means to the horizontal input terminals of said cathode ray display apparatus;

electronic switching means having at least first and second input terminals adapted to receive, respectively, the intermediate frequency component of said frequency modulation signal and the sequential bursts from said calibrator apparatus and an output terminal, said electronic switching means being operative to provide an output signal comprising alternate half cycles of the intermediate frequency component of said frequency modulation signal and the sequential bursts from said calibrator apparatus; and means for applying the output signal from said electronic switching means to said amplifier circuit means, whereby a display is generated on said cathode ray display apparatus indicating the modulating signal and the modulation limits and the relation therebetween.

* * * * *